United States Patent [19]

Nielsen

[11] Patent Number: 4,512,692

[45] Date of Patent: Apr. 23, 1985

[54] TOOL SHAFT FOR A TOOL OF THE PERCUSSIVE AND ROTATIVE TYPE

[75] Inventor: Mogens B. Nielsen, Glostrup, Denmark

[73] Assignee: Durofac-Kartro A/S, Valby, Denmark

[21] Appl. No.: 399,284

[22] Filed: Jul. 19, 1982

[30] Foreign Application Priority Data

Jul. 24, 1981 [DK] Denmark ............................ 3335/81

[51] Int. Cl.$^3$ ............................................... B23B 31/06

[52] U.S. Cl. .................................. 408/226; 279/19.5; 279/89; 173/133; 403/349

[58] Field of Search .................. 408/226, 239 A, 240; 279/19, 19.5, 89, 19.4, 22, 76; 403/348, 349; 173/133

[56] References Cited

U.S. PATENT DOCUMENTS

| | | | |
|---|---|---|---|
| 2,039,855 | 5/1936 | Stone | 279/89 |
| 2,219,907 | 10/1940 | Ross | 403/349 |
| 2,367,458 | 1/1945 | Coplen | 408/226 |
| 2,572,840 | 10/1951 | Curtis | 279/19 |
| 2,823,040 | 2/1958 | Fischer | 279/19 |
| 4,047,722 | 10/1977 | Nielsen et al. | 279/19.5 |

FOREIGN PATENT DOCUMENTS

| | | | |
|---|---|---|---|
| 2551125 | 5/1977 | Fed. Rep. of Germany | 408/239 A |
| 2811677 | 9/1979 | Fed. Rep. of Germany | 279/22 |

*Primary Examiner*—Gil Weidenfeld
*Assistant Examiner*—Daniel W. Howell
*Attorney, Agent, or Firm*—Dennison, Meserole, Pollack & Scheiner

[57] ABSTRACT

A tool shaft, especially for drills of the percussive type, such as hammer drills, is adapted to be mounted in a tool holder having fixed driving elements, and the shaft is therefore provided with guiding recesses driving recesses and interconnecting transition recesses which recesses in combination with the driving elements form a type of bayonet joint.

In order to improve the universal applicability of the tool shaft also in connection with tool holders of the type having radially movable driving elements, the driving recesses are formed with a radial depth exceeding that of the guiding recesses, and each of the guiding recesses has a cross-sectional shape so as to define a rib or edge between each associated pair of guiding and driving recesses so as to prevent spherical or cylinder shaped driving elements of the radially movable type from being moved unintentionally from the driving recess into the associated guiding recess.

9 Claims, 4 Drawing Figures

TOOL SHAFT FOR A TOOL OF THE PERCUSSIVE AND ROTATIVE TYPE

BACKGROUND OF THE INVENTION

1. Field of the Invention

The present invention relates to a tool shaft for a tool of the percusive and rotative type, such as hammer drills and other percussive drills, and having a substantially cylindrical end portion adapted to be releasably received within a cylindrical bore of a tool holder having a least one driving member extending radially into the bore.

2. Description of the Prior Art

A tool shaft of this type is known for example from U.S. Pat. No. 4,047,722. The tool shaft disclosed in this patent specification is adapted to be mounted in a tool holder, which has fixed driving members extending into the cylindrical bore of the holder and forming together with the recesses of the tool shaft a kind of bayonet joint. Each of the fixed driving members has a surface part corresponding substantially to part of a cylindrical surface having an axis extending at right angles to the longitudinal axis of the bore of the holder and of a tool shaft mounted in the holder.

The said known tool shaft has two pairs of first and second recesses arranged symmetrically about the longitudinal axis of the tool shaft. Each of the first recesses is formed by a plane milled surface part and functions as a guide surface for guiding a corresponding driving member of the holder into the second recess when the shaft is inserted into the holder. Each of these second recesses has a cross-sectional profile defining a obtuse angle and is adapted to drivingly engage with a corresponding driving member of the holder. Each of the peripherally extending third recesses or transition recesses interconnecting the guiding and driving recesses of the respective pair of recesses is defined by a surface part having a cross-sectional profile in the form of an arc of a circle having a radius corresponding substantially to the radius of the cylinder-shaped driving members of the holder. When this known tool shaft is inserted into a corresponding tool holder, the tool shaft is at first displaced axially in relation to the tool holder, while the driving elements are moved along the guiding recesses or first recesses, and thereafter the tool shaft is rotated in relation to the tool holder, whereby the driving members of the holder are passed into the second recesses or driving recesses having closed opposite ends via the third recesses or transition recesses.

When the tool shaft is provided with two pairs of recesses like the known embodiment described above the guiding and driving recesses in each pair may be peripherally off-set only 90° at the most. Furthermore, in order to obtain acceptable conditions for transmission of power between the driving elements of the tool holder and the tool shaft the recesses must have a certain radial depth determined by the shape and size of the parts of the driving elements extending into the bore of the tool holder. Consequently, the plane milled surface part defining the first recess or guiding recess, and the surface part defining the associated second recess or driving recess will meet or intersect along a line extending parallel to the tool axis and being spaced from that axis at a radial distance which is substantially smaller than the radius of the cylindrical outer surface of the tool shaft.

It has been found that when such a tool shaft is used in connection with a tool holder having spherical driving elements or cylindrical driving elements having their axes extending parallel to the axis of the tool holder (such as the tool holder disclosed in Austrian patent specification No. 285405) there is a certain risk that the tool shaft is inadvertently released from the holder during operation of the tool, especially when the tool is of the type exposed to percussions during operation, such as hammer drills and other percussive drills. The reason is that the axially extending shaft edge portion separating the guiding recess from the corresponding driving recess is spaced radially inwardly from the cylindrical outer surface of the tool shaft as explained above. Therefore, especially when the tool shaft has been exposed to wear, the separating shaft edge cannot always prevent the spherical or cylinder shaped driving elements from being transferred directly from the driving recess to the corresponding guiding recess without passing the transition recess, in case the tool bit is exposed to an incidental rotative force directed in the same direction as the rotative driving force transmitted through the tool holder.

SUMMARY OF THE INVENTION

The present invention provides a tool shaft of the above type substantially decreasing the risk of unintentional release of the tool shaft from a corresponding tool holder having driving elements with driving surfaces which are spherical or cylindrical with the cylinder axes extending parallel with the axis of the tool holder.

Thus, the present invention provides a shaft for a tool of the percussive type and rotative type and having a substantially cylindrical end portion adapted to be releasably received within a cylindrical bore of a tool holder having at least one driving member extending radially into the bore, the cylindrical end portion of the shaft comprising at least one pair of axially coextending, peripherally off-set first and second recesses interconnected by a peripherally extending third recess, the first recess extending from the free end of the cylindrical end portion and the second recess having closed axially opposite ends and driving surface for drivingly engaging with a driving element of the tool, each of said first, second, and third recesses being adapted to slidably receive the driving member of the tool holder therein when the tool shaft is inserted in the holder, and the novel features of the invention is that the surface part defining the first recess is shaped so as to define between the pair of first and second recesses (or guiding and driving recesses) a separating shaft portion having a radially outward surface part substantially coinciding with the cylindrical outer surface of the cylindrical end portion. The separating shaft portion will then effectively separate the first and second recesses, or the guiding recess and the corresponding driving recess, so that the tool shaft may be mounted as well in tool holders having cylindrical driving members or elements—whether the axes of these cylindrical driving members extend transversely to or parallel with the axis of the tool shaft—as in tool holders having spherical driving members or elements, without any risk of unintentional release of the tool shaft from the tool holder.

The first recess or guiding recess may have any suitable cross-sectional shape defining the above mentioned shaft portion separating the first and second recesses or the guiding or driving recesses, provided that possible radially movable driving members or elements of tool holders in which the tool shaft should be able to cooperate, may be slidably received in the guiding recess. However, the surface part defining the first recess or guiding recess preferably has a cross-sectional profile defining an obtuse angle, and the side of the angle adjacent to the second recess of the pair of recesses is then preferably shorter than the other side of the angle. The first recess or guiding recess may then receive stationary driving elements of the type described for example in the above U.S. patent specification.

When the tool shaft of the invention is used in connection with tool holders of the type having radially movable driving members or elements the tool shaft may be mounted in the holder without using the guiding recess. In tool holders having radially movable driving members or elements the radial extension of these members or elements into the cylindrical bore of the holder normally exceeds the radial extension of the driving members or elements in corresponding holders of the type in which the driving members or elements are not radially movable. Therefore, the radial depth of the second recess or driving recess preferably exceeds that of the first recess or guiding recess, whereby the same tool shaft may be used in connection with various types of tool holders. In some drill holders the driving members or elements comprise spline-like driving members extending into the cylindrical bore of the tool holder. In order to enable the tool shaft of the invention to be received in a holder of that type the first recess or guiding recess may extend axially beyond the portion at which it is connected to the first recess, and this extension of the first recess may be in the form of a channel adapted to receive the spline-like member. In such case the extension of the first recess may also function as a driving recess.

BRIEF DESCRIPTION OF THE DRAWING

The invention will now be further described with reference to the drawings, wherein.

DESCRIPTION OF THE PREFERRED EMBODIMENTS

Figure 1:
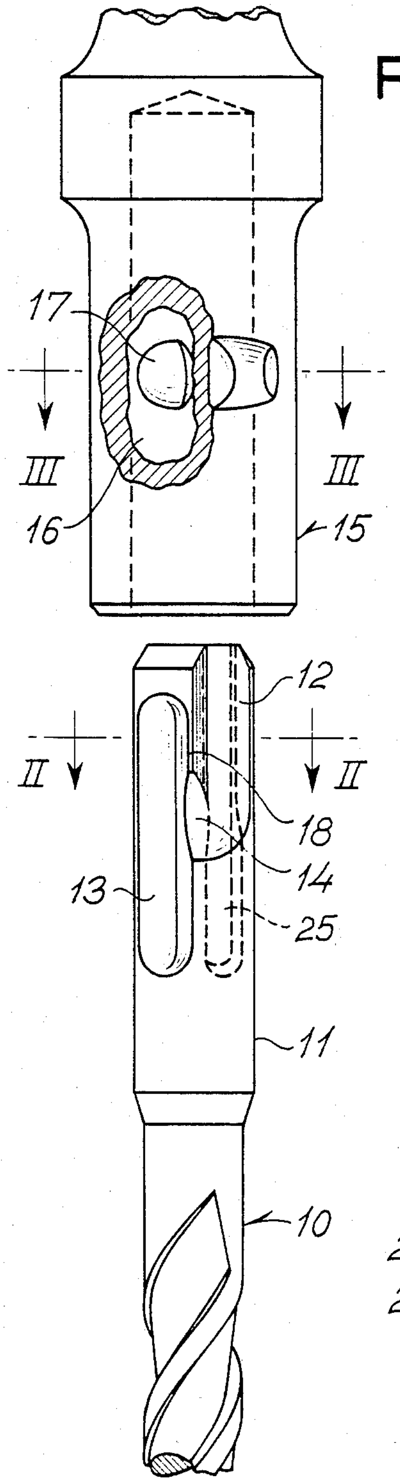
FIG. 1 is a side view of an embodiment of a drill shaft and a corresponding drill holder, part of the wall of the drill holder being cut away

FIG. 1 shows a hammer drill 10 with a shaft 11, having two diametrically oppositely arranged guiding recesses 12 (FIG. 2) extending axially from the free end of the drill shaft 11 towards the working part of the drill. Two diametrically oppositely positioned, axially extending driving recesses 13 are arranged between the guiding recesses 12, and the axially outer ends of these driving recesses are axially spaced from the free end of the shaft 11, so that each driving recess has oppositely arranged closed ends. As shown in FIG. 1, each of the guiding recesses 12 is connected to the middle portion of the associated driving recess 13 by means of a peripherally extending transition recess 14. FIGS. 1 and 3 illustrate a drill holder 15 which may be mounted on the spindle of a hammer drilling machine, not shown, and which may be of the type disclosed in the above U.S. patent specification. The drill holder 15 has an axial bore 16 and driving elements or members 17 extending radially into the bore. As best shown in FIG. 3 these driving elements 17 are formed by deformation of the cylindrical wall of the drill holder in a known manner, and viewed from the axial bore 16 these driving elements are substantially in the form of cylinder surface parts having their axes extending at right angles to the longitudinal axis of the bore 16 and in a plane extending at right angles to that longitudinal axis.

When the shaft 11 of the drill 10 is to be mounted in the holder 15 the shaft 11 is arranged in such a rotational position in relation to the drill holder that the driving elements 17 are aligned with the guiding recesses 12. Thereafter, the drill shaft is pushed into the holder till the elements 17 have reached the bottom of the guiding recesses, and the drill is then rotated in such a direction that the driving elements 17 are passed into the driving recesses 13 via the transition recesses 14. These driving recesses have an axial length substantially exceeding the axial extension of the driving elements, whereby, within certain limits, the drill 10 may move axially in relation to the holder during use.

Figure 2:
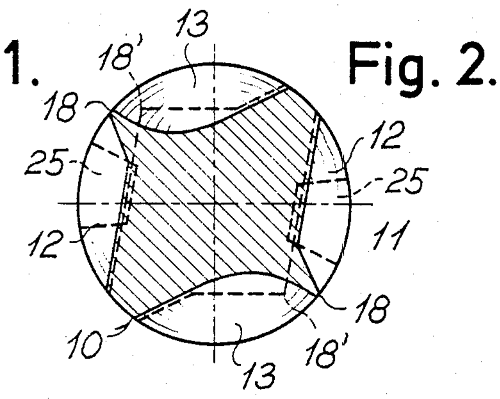
FIG. 2 is a sectional view of in the drill shaft along the line II—II in FIG. 1.
Figure 3:
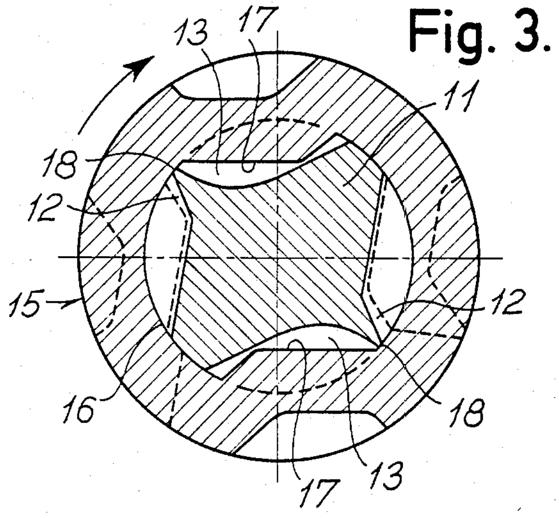
FIG. 3 is a sectional view along the line III—III in the drill holder with the drill shaft inserted therein.
Figure 4:
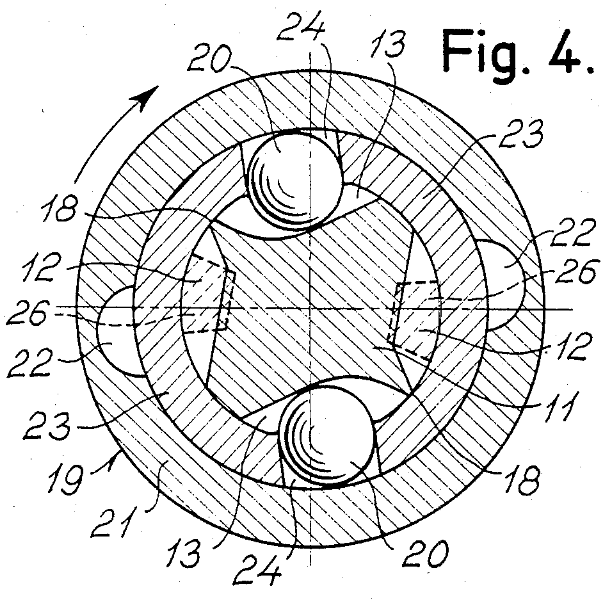
FIG. 4 is a sectional view of a different type of drill holder in which the same drill shaft has been mounted.

As shown in FIGS. 2–4, the guiding recesses 12 have a cross-sectional profile defining an obtuse angle. The driving recesses 13 are radially deeper than the guiding recesses 12 and have bottom surface parts with a curved cross-sectional shape, and the shorter side of the profile of the guiding recess 12 is positioned adjacent to the associated driving recess 13 so as to define an axially extending edge or rib 18 extending radially right out to the cylindrical surface of the shaft 11 as shown in FIG. 2. In FIG. 2 the cross-section of the drill shaft which is known from the above U.S. patent specification, and wherein the guiding recesses are formed by plane milled surface parts, has been indicated with dotted lines. It is noted that the corresponding edge or rib 18' in the known cross section is located at a position which is substantially spaced radially inwardly from the cylindrical outer surface of the drill shaft.

FIG. 3 illustrates in broken lines the driving elements 17 positioned in the guiding recesses 12 when the drill shaft is pushed into the holder, and it is noted that the fixed driving elements 17 and the guiding recesses 12 have substantially complementary cross-sectional shapes. Furthermore, FIG. 3 illustrates in solid lines how the driving elements or members 17 engage with surface parts of the driving recesses 13 so that the drill shaft 11 is forced to rotate in the direction indicated by an arrow in FIG. 3, when a drilling machine, not shown, is rotating the holder 15 in that direction.

FIG. 4 shows the drill shaft 11 mounted in a bore holder 19 of another known type having radially movable driving elements or members 20, which may be spherical or shaped as cylinders with axes extending parallel with the axis of the drill shaft 11. The drill holder 19 comprises an outer ring 21 having two diametrically oppositely arranged semispherical or semicylindrical depressions 22 formed in its inner surface, and an inner ring 23 having two diametrically oppositely arranged cut-outs 24 through which parts of the spherical or cylinder-shaped driving elements 20 may extend into the inner passage or bore 13 defined by the inner ring 23.

When the drill shaft 11 shown in FIG. 1 is to be inserted into a drill holder of the type shown in FIG. 4, the outer ring 21 is rotated to a position in which the depressions 22 are registered with the cut-outs 24 and the driving elements 20 arranged therein. The driving elements 20 may now be pushed radially outwardly from the bore 13 and into the depressions 22, and the tool shaft 11 is then arranged in such an angular opposition in relation to the holder 19 that the driving recesses 13 are registered with the driving elements 20, and thereafter the drill shaft 11 is pushed into the holder. The outer ring 21 of the holder is now rotated so as to push the driving elements 20 radially inwardly into the driving recesses 13 of the drill shaft 11 as shown in FIG. 4. When the drill holder 19 is rotated in the direction indicated by an arrow, the drill shaft 11 and, consequently, also the drill 10 will be forced to rotate in the same direction due to the engagement of the driving elements 20 into the driving recesses 13. As each of the edges or ribs 18 defines a clear separation between each driving recess 13 and the associated guiding recess 12 there is no risk that an incidental torsional actuation of the bit of the drill 10 in the direction indicated by the arrow in FIG. 4 will cause the driving elements 20 to move into the adjacent respective guiding recesses 12 so that the drill shaft may unintentionally be released from the holder 19. Due to the relatively large radial depth of the driving recesses 13 and due to the curved bottom of these recesses they may engage with radially movable driving elements having different radial penetration into the axial bore of the holder. Therefore, the drill shaft according to the invention may be used not only in connection with drill holders having fixed driving elements as shown in FIGS. 1 and 3, but also in connection with drill holders having radially movable driving elements of various sizes and shapes. Consequently, the drill shaft according to the invention is more universally applicable than known drill shafts.

Some types of drill holders are provided with axially extending, fixed spline-like driving elements or members in addition to radially movable driving members or locking members. Therefore, as indicated with dotted lines in FIGS. 1 and 2 each of the guiding recesses 12 may be provided with an axial extension in the form of a channel 25, which is adapted to receive such corresponding spline-like driving member 26, which may, for example, be formed on the inner surface of the inner ring 23 of the holder as that shown in FIG. 4.

While the tool shaft according to the invention has been described especially in connection with drills of the percussive type, it should be understood that the tool shaft according to the invention may also be used for other types of rotating tools, such as milling tools, screw drivers and the like. It should also be noted that the tool shaft according to the invention may be an integral part of the associated tool, but may, alternatively, be formed on so-called adapters, on which the tool may be releasably mounted.

I claim:

1. In a tool shaft configuration for a tool of the percussive and rotative type and having a substantially cylindrical end portion adapted to be releasably received within a cylindrical bore of a tool holder having at least one driving member extending radially into the bore, the cylindrical end portion of the shaft comprising at least one pair of axially coextending, peripherally off-set first and second recesses interconnected by a peripherally extending third recess, the first recess extending from the free end of the cylindrical end portion and the second recess having closed axially opposite ends and driving surface for drivingly engaging with a driving element of the tool, each of said first, second, and third recesses being adapted to slidably receive the driving member of the tool holder therein when the tool shaft is inserted in the holder, the improvement that the surface part defining the first recess is shaped so as to define between the pair of first and second recesses a separating shaft portion having a radially outward surface part substantially coinciding with the cylindrical outer surface of the cylindrical end portion, and wherein the peripherally extending third recess is connected to the second recess at a position spaced from the ends thereof, and that the first recess includes an extension extending axially beyond the position at which the second recess is connected to the first recess, whereby said tool shaft can be accommodated by socketed tool holders having fixed or radially extensible protuberances or both.

2. A tool shaft according to claim 1, wherein the surface part defining the first recess has a cross-sectional profile defining an obtuse angle, and wherein the side of the angle adjacent to the second recess of the pair of recesses is shorter than the other side of the angle.

3. A tool shaft according to claim 1, wherein the radial depth of the second recess exceeds that of the first recess.

4. A tool shaft according to claim 3, wherein the bottom of the second recess has a concavely curved cross-sectional shape.

5. A tool shaft according to claim 1, wherein the radially outward surface part of the separating shaft portion is a peripherally narrow surface part extending along a generatrix of the cylindrical outer surface of the cylindrical portion of the tool shaft.

6. A tool shaft according to claim 1, wherein the cylindrical end portion of the shaft comprises two identical pairs of first and second recesses arranged symmetrically about the longitudinal axis of the end portion of the tool shaft.

7. A tool shaft according to claim 1, wherein the extension of the first recess is in the form of a channel adapted to receive a spline-like driving member extending into the cylindrical bore of the tool holder.

8. A tool shaft according to claim 7, wherein the surface part defining the first recess has a cross-sectional profile defining an obtuse angle, and wherein the side of the angle adjacent to the second recess of the pair of recesses is shorter than the other side of the angle.

9. A tool shaft according to claim 7, wherein the radial depth of the second recess exceeds that of the first recess.

* * * * *